(12) United States Patent
Mazanec et al.

(10) Patent No.: US 7,404,936 B2
(45) Date of Patent: Jul. 29, 2008

(54) CATALYSTS, IN MICROCHANNEL APPARATUS, AND REACTIONS USING SAME

(75) Inventors: Terry J. Mazanec, Solon, OH (US); Yong Wang, Richland, WA (US); Laura J. Silva, Dublin, OH (US); David P. VanderWiel, Columbus, OH (US)

(73) Assignee: Velocys, Plain City, OH (US)

( * ) Notice: Subject to any disclaimer, the term of this patent is extended or adjusted under 35 U.S.C. 154(b) by 617 days.

(21) Appl. No.: 10/279,089

(22) Filed: Oct. 22, 2002

(65) Prior Publication Data

US 2004/0076562 A1 Apr. 22, 2004

(51) Int. Cl.
*F28D 15/00* (2006.01)
(52) U.S. Cl. .................................................. 422/198
(58) Field of Classification Search .................. None
See application file for complete search history.

(56) References Cited

U.S. PATENT DOCUMENTS

| | | | |
|---|---|---|---|
| 4,133,650 A * | 1/1979 | Germerdonk et al. ......... 95/166 |
| 4,472,533 A | 9/1984 | Moskovits | |
| 5,202,303 A | 4/1993 | Retallick et al. | |
| 5,248,251 A | 9/1993 | Dalla Betta et al. | |
| 5,550,300 A | 8/1996 | Taylor, Jr. et al. | |
| 5,899,679 A | 5/1999 | Euzen et al. | |
| 5,945,368 A | 8/1999 | Felthouse et al. | |
| 6,192,596 B1 | 2/2001 | Bennett et al. | |
| 6,274,101 B1 * | 8/2001 | Sechrist ...................... 422/198 |
| 6,488,838 B1 | 12/2002 | Tonkovich et al. | |
| 6,969,505 B2 * | 11/2005 | Tonkovich et al. ....... 423/648.1 |
| 2002/0031471 A1 | 3/2002 | Tonkovich et al. | |
| 2003/0152488 A1 | 8/2003 | TeGrotenhuis | |
| 2003/0180216 A1 | 9/2003 | TeGrotenhuis | |

FOREIGN PATENT DOCUMENTS

EP 1198344 B1 6/2003

OTHER PUBLICATIONS

TeGrotenhuis et al., U.S. Appl. No. 60/379,163, filed May 9, 2002, especially p. 22, lines 1-6.
International Search Report for PCT/US03/33104, mailed Jun. 30, 2004.
Janicke et al., "The Controlled Oxidation of Hydrogen from an Explosize Mixture of Gases Using a Microstructured Reactor/Heat Exchanger and Pt/Al2O3 Catalyst," J. Catal. 191, 282-293 (2000).
Baratti et al., "Optimal Catalyst Distribution in Catalytic Plate Reactors," Intl. J. Chem. React. Eng., vol. 1, 1-10 (2003).

* cited by examiner

*Primary Examiner*—Yvonne Eyler
*Assistant Examiner*—Yevgeny Valenrod
(74) *Attorney, Agent, or Firm*—Frank Rosenberg

(57) ABSTRACT

The present invention provides new microreactor systems, catalysts, and chemical processes. Methods of making novel catalysts and reaction apparatus are also described.

35 Claims, 7 Drawing Sheets

CATALYSTS, IN MICROCHANNEL APPARATUS, AND REACTIONS USING SAME

FIELD OF THE INVENTION

The invention relates to catalysts, microchannel apparatus and methods of conducting reactions in microchannels.

BACKGROUND OF THE INVENTION

Microreactors, which can have improved heat and mass transfer compared to conventional reactors, are a new type of reactor that offer the potential to significantly improve the efficiency of chemical processes. This potential has engendered intense efforts toward developing microreactors, catalysts and micro-processes. A recent review of this technology, containing 236 citations, has been provided by Gavrilidis et al., "Technology And Applications Of Microengineered Reactors," Trans. IChemE, Vol. 80, Part A, pp. 3-30 (January 2002).

A more conventional approach to reactions in small channels has involved reactions in honeycombs. In U.S. Pat. No. 5,248,251, Dalla Betta et al. described a partial combustion process in which a combustible gas mixture is passed through a monolith that has a graded catalyst in which the catalyst on a leading portion of the support has a higher activity than has the catalyst on a trailing portion of the support.

A recent patent for producing a hydrogen-rich gas describes a catalyst on a honeycomb that has a layer of a partial oxidation catalyst and a layer of a steam reforming catalyst. An embodiment is described in which the catalyst layers are graded such that the partial oxidation catalyst has its maximum thickness near the inlet and diminishes over the length of the catalyst structure to practically zero near the outlet and the steam reforming catalyst has a near zero thickness near the inlet and increases over the length of the catalyst structure to its maximum thickness near the outlet.

SUMMARY OF THE INVENTION

The present invention provides new microreactor systems, catalysts, and chemical processes. Methods of making novel catalysts and reaction apparatus are also described.

In one aspect, the invention provides a method of conducting a reaction, comprising: flowing at least one reactant into a microchannel, and reacting the at least one reactant in the presence of the graded catalyst within the microchannel to form at least one product. In this aspect, the microchannel includes a graded catalyst that substantially fills a cross section of the microchannel. The graded catalyst has a distribution of catalytically active material such that the at least one reactant is exposed to a higher concentration of catalytically active material in one area of the catalyst than in another area of the catalyst. As with all methods mentioned herein, the invention also includes apparatus for conducting these methods and systems that include the apparatus and reactants and/or products.

In another aspect, the invention provides a method of conducting a reaction, comprising: flowing at least one reactant into a microchannel through a microchannel inlet and reacting the at least one reactant in the presence of the graded catalyst within the microchannel to form at least one product. In this aspect, the microchannel contains a graded catalyst that has a lower concentration of catalytically active material near the inlet as compared with elsewhere in the microchannel. In this aspect, the microchannel contains only one catalyst—for example, the microchannel does not contain both a reforming catalyst and a partial oxidation catalyst. Although the graded catalyst may consist of more than one catalytic element (such as to include a promoter metal), the graded catalyst is not in contact with a different catalyst material. Furthermore, the catalyst is an active catalyst, not merely a catalyst precursor. For example, in some preferred embodiments for an exothermic reaction (such as Fischer-Tropsch), a catalyst is graded such that the least amount of catalyst is present at (or near) the inlet where the reactant concentration is greatest and where the least amount of product is present, and increases along the length of the reaction microchannel to the most amount of catalyst near the outlet where only a relatively small amount of reactants remain such that the heat released or the temperature is relatively uniform along the flow direction which is important for controlling the product selectivity.

In another aspect, the invention provides an apparatus comprising: a microchannel; and a graded catalyst disposed in the microchannel; wherein the graded catalyst has a varying thermal conductivity such that the thermal conductivity in one part of the graded catalyst is at least 25%, more preferably 50% (and sill more preferably at least 200%) higher than in another part of the catalyst. The invention also includes methods of conducting chemical reactions by flowing at least one reactant into a microchannel that includes a graded catalyst having a varying thermal conductivity; and forming at least one product.

In a further aspect, the invention provides a method of conducting a reaction, comprising: flowing at least one reactant into a microchannel through a microchannel inlet and reacting the at least one reactant in the presence of the graded catalyst within the microchannel to form at least one product. The microchannel comprises (includes) a graded catalyst that has a higher concentration of catalytically active material in the catalyst nearer a microchannel wall than the concentration of the catalytically active material in the catalyst nearer the center of the microchannel. The microchannel wall is adjacent to a heat exchanger such that, during reaction, heat is transferred between the microchannel and the heat exchanger. While heat need not be transferred at all times, it must be transferred during at least some point of the reaction and preferably during substantially all of the reaction (not just for startup). Placing more catalyst near a channel wall that is adjacent to a heat exchanger shortens the distance for heat transfer.

In another aspect, the invention provides a method of conducting a reaction, comprising: flowing at least one reactant into a first reaction microchannel, and reacting the at least one reactant in the presence of the graded catalyst within the first reaction microchannel. A graded catalyst is disposed in the first reaction microchannel. The graded catalyst has a distribution of catalytically active material such that the at least one reactant is exposed to a higher concentration of catalytically active material in one area of the catalyst than in another area of the catalyst. During reaction, heat is exchanged between the first reaction microchannel and an adjacent, second reaction microchannel. One of the first or second reaction channels comprises an exothermic reaction and the other of the reaction channels comprises an endothermic reaction. At least one first product is formed in the first reaction microchannel and at least one second product is formed in the second reaction microchannel.

In a further aspect, the invention provides a method of conducting a reaction, comprising: flowing at least one reactant into a microchannel, and reacting the at least one reactant in the presence of a graded catalyst within the microchannel to form at least one product. In this aspect, the catalyst consists of a graded catalyst having of a distribution of a catalytically active material such that the at least one reactant is exposed to a higher concentration of catalytically active material in one area of the catalyst than in another area of the catalyst. By "consists of," it is meant that there is only one type of catalyst at any point along the length of the microchannel (preferably, only one type of catalyst along the length of the reaction zone in the microchannel). The reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift.

In another aspect, the invention provides a method of conducting a reaction, comprising: flowing at least one reactant into a microchannel, and reacting the at least one reactant in the presence of the graded catalyst within the microchannel to form at least one product. A graded catalyst is disposed in the microchannel. The graded catalyst comprising a distribution of catalytically active material such that the at least one reactant is exposed to a higher concentration of catalytically active material in one area of the catalyst than in another area of the catalyst. The reactant, or reactants, and catalyst are selected such that the step of reacting is selected from the group consisting of: acetylation, addition reactions, alkylation, dealkylation, hydrodealkylation, reductive alkylation, amination, ammonia synthesis, aromatization, arylation, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, hydrocarbon reforming, reverse water gas shift, Sabatier, sulfonation, telomerization, transesterification, trimerization, and water gas shift.

In another aspect, the invention provides a method of forming a catalyst microinsert, comprising: adding a catalyst precursor into a mold; wherein the mold has at least one dimension of 5 mm or less; forming a monolithic catalyst microinsert; and removing the monolithic catalyst microinsert.

In yet another aspect, the invention provides a method of making catalytic apparatus, comprising: applying a magnetic or electric field to a microchannel; and loading or orienting particles in the microchannel under the influence of the magnetic or electric field. Here, "applying" (obviously) means something other than existing in the earth's magnetic field, and does not mean electroplating or electrochemical deposition.

In another aspect, the invention provides apparatus comprising: a microchannel; and hollow or porous catalyst particles disposed in the microchannel, wherein the porous catalyst particles comprise large pores within the individual particles; wherein the microchannel has a cross sectional area; wherein the large pores are defined as pores having a pore size of at least 1% of the particle size of the particle in which the pores exist; and wherein the hollow or porous catalyst particles have a volume average particle cross-section that is 1 to 40% that of the cross sectional area of the microchannel. Pore size is measured by microscopy (usually scanning electron microscopy (SEM)) or mercury porisimetry. Particle size is mass average and is based on the conventional understanding of particles fitting through a mesh screen. "Average" is volume average such that a large particle has a much greater influence on the average than a small particle. In some preferred embodiments, the hollow or porous catalyst particles have a volume average particle cross-section that is 10 to 40% that of the cross sectional area of the microchannel. The cross-sectional area of the reaction microchannel is measured at a point in the reaction microchannel where particles are lodged. In this aspect of the invention, "porous catalyst particles" includes both particles and pellets, but does not include foams, felts, wads, screens, mesh or honeycombs. Hollow particles, however, may include foams, felts, wads, screens, mesh or honeycombs as well as particles or pellets (provided the particles meet the definition of hollow set forth herein). The invention also includes methods of conducting reactions in this apparatus, and methods of making apparatus by adding these particles into microchannels.

The invention also provides a method of conducting a chemical reaction, comprising: passing at least one reactant fluid into a reaction microchannel that contains catalyst particles dispersed in a fluid; wherein at least one reactant within the at least one reactant fluid reacts to form at least one product; wherein at least some of the catalyst particles flow out of the microchannel to form a catalyst particle stream; and passing a stream of catalyst particles comprising said catalyst particle stream into the same or a different reaction channel. The invention also includes systems comprising microchannel apparatus containing a catalyst particle stream.

In a further aspect, the invention provides apparatus comprising: a microchannel, and high aspect ratio particles disposed within the microchannel. The high aspect ratio particles are oriented within the microchannel such that at least 40% (more preferably at least 50% and still more preferably at least 75%) by mass of the high aspect ratio particles are substantially oriented in one direction that is perpendicular to a wall of the microchannel. "Substantially oriented" means within 45° of one direction as measured along the primary axis (averaged by mass in each particle) of each particle. The high aspect ratio particles are preferably a support material, and more preferably a catalyst material, and in some embodiments a graded catalyst. In some embodiments, the high aspect ratio particles are mixed with low aspect ratio particles. The invention also includes methods of reacting a reactant in this apparatus and methods of making this apparatus.

In another aspect, the invention provides apparatus for conducting a chemical reaction, comprising: an open flow path having a cross sectional area comprising at least one dimension of 5 mm or less, wherein the cross sectional area is perpendicular to a direction of flow; a catalyst defining at least a portion of one wall of the open flow path within the cross sectional area comprising at least one dimension of 5 mm or less, such that no point within the cross sectional area in the open flow path is more than 5 mm away from the catalyst; and a flow disrupter and/or micromixer; and wherein the micromixer, if present, comprises a catalyst. The invention also includes methods of conducting chemical reactions in this apparatus.

Glossary of Terms

"Channels" refers to the generally accepted meaning and includes conduits and other means for directing the flow of a fluid. Channels of the invention include at least one opening, typically with an inlet and outlet, and may include other openings. As will be seen in the description below of various embodiments, numerous functions other than simple transport can occur within channels. A reaction channel (including a reaction microchannel) does not include inlet or outlet valves or inlet or outlet orifices (of course inlet and outlet orifices, valves, etc. may be connected to a reaction channel but they are not considered part of the reaction channel itself).

"Catalyst" is a material that enhances reaction parameters, for example reaction rate, without itself being consumed.

A "Cross-sectional area," or "an area of a cross-section," of a reaction channel is measured perpendicular to the direction of net flow and includes all area within a reaction channel including catalyst particles (or monolith) and/or a catalyst wall coating (including a thermally grown oxide (if present) but does not include the reaction channel walls. For reaction channels that curve along their length, cross-sectional area is measured perpendicular to the direction of net flow at a selected point along a line that parallels length and is at the center (by area) of the reaction channel. Statements such as "a cross sectional area varies" mean that there is a significant variation in area, not merely a variation in surface roughness. Dimensions of height and width are measured from one reaction channel wall to the opposite wall and are not changed by application of a catalyst coating, and are average values that account for variations caused by surface roughness, or variations caused by corrugations, etc.

"Engineered catalyst" is a single piece or several pieces of catalysts that can be shaped for a particular reaction channel and inserted or stacked into a microchannel. Some examples are foams and felts (that is, a collection of nonwoven fibers or strands). Pellets, coatings and powders are not engineered catalysts.

"Catalyst particles dispersed in a liquid" are solid, typically colloidal, particles that, with the liquid, form a slurry or colloidal dispersion.

"Composition" is a gas, a liquid, or a fluid mixture (such as a colloid which could be a solid/liquid mixture). The composition may itself be reactive or may be mixed with another material.

"Direction of flow" is the direction of net flow through at least one segment of a reaction channel. For a straight channel, the direction of flow is from the inlet or inlets of a channel to the outlet or outlets of the channel.

"Flow path" is a path in the reactor through which travels a composition.

"Fluid Heat exchanger" is a chamber (having an inlet and an outlet, or multiple inlets and/or outlets) through which a fluid (i.e., a gas or liquid) flows and, through a wall of the reaction channel, conducts heat away from or toward a reaction channel. A fluid heat exchanger is not an electrical heater.

A "graded catalyst" has a gradient, or gradients, of catalytic activity (such as by varying concentration or surface area of a catalytically active metal or the turnover rate of the active sites or by varying the physical properties and/or form of the catalyst material) that varies as a function of distance; for example, a lower active metal concentration at the front of a reaction channel that increases to a higher concentration near the back of the reaction channel; or a lower concentration of active metal nearer the center (i.e., midpoint) of a reaction channel and a higher concentration nearer a reaction channel wall, etc. One example of a physical properties is thermal conductivity. Surface area of catalytically active metal can be varied by varying size of metal sites on a constant surface area support or by varying the surface area of the support such as by varying support type or particle size. A graded catalyst may have a single catalytic component or multiple components (for example, a bimetallic or trimetallic catalyst). In some preferred embodiments, the catalyst gradually changes its properties and/or composition as a function of distance rather than abrupt or discontinuous changes. A graded catalyst is not merely a rimmed particle or particles that have an "eggshell" distribution of catalytically active metal within each particle.

"Heat exchanger" is a component that adds or removes heat from a reaction chamber. It is an active component, not merely ambient air or a stagnant fluid. Preferably, a heat exchanger is a fluid heat exchanger.

"Heat transfer distance" is the distance between the midpoint of a reaction channel and the wall of a heat exchanger. The midpoint is the area-weighted center point of a cross-section of the reaction channel, and distance is typically measured perpendicular to flow. In other words, the midpoint is the intersection of lines that bisect (divide in half) the cross-sectional area of the reaction channel.

"High aspect ratio particles" are anisotropically shaped particles that have a length (longest dimension) that is at least 2 times (more preferably, at least 5 times and still more preferably at least 10 times) greater than either (but not necessarily both) a width or a height. Examples include wires, whiskers, plates and flakes.

"Hollow particles" are particles in which the density of the outermost 20% (by volume) of the particle has a density that is at least 20%, more preferably at least 50%, greater than the average density of the interior 90% by volume.

"Inlet side" and "outlet side" are relative terms. Every part of the inlet side of a reaction chamber is closer to an inlet into a reaction channel, and every part of the outlet side of a reaction chamber is closer to an outlet from a reaction channel. In preferred embodiments, there are a single inlet and a single outlet connected to a reaction channel, however, in other embodiments the invention includes reaction channels with multiple inlets and/or outlets.

A "micromixer" is a component that is disposed within a bulk flow region of a reaction chamber (preferably a microchannel)—where the bulk flow region is substantially unobstructed except for the micromixer. A micromixer has at least one dimension of 5 mm or less. For purposes of defining a bulk flow region in this invention, when a micromixer is present, the presence of a micromixer does not negate the existence of a bulk flow region.

A "microchannel," for purposes of the present invention, is a channel having a height of 5 mm or less, preferably 2 mm or less, and still more preferably 1 mm or less, and in some preferred embodiments height is in the range of 0.1 and 2 mm. Length of a microchannel is typically not crucial but, in some embodiments is less than 10 cm. Length is defined to be the same direction as net flow through a microchannel. Channel cross-sections can be, for example, rectangular, circular, triangular, or irregularly shaped. Height and width are perpendicular to length and either or both can vary along the length of a microchannel. Height and width can be arbitrarily selected; in the present invention, height is defined as the smallest dimension of a channel that is perpendicular to flow.

In some embodiments, such as steam reforming, width is preferably 5 cm or less, more preferably 1 cm or less, and in some embodiments in the range of 0.1 mm and 2 cm.

"Porous catalyst particles" have the porosity of the "porous catalyst material" described below.

"Thermally conductive materials" refers to the generally accepted understanding. Carbon and metals are thermally conductive while most of the common metal oxides and plastics are not.

DESCRIPTION OF PREFERRED EMBODIMENTS

Apparatus

Figure 1:
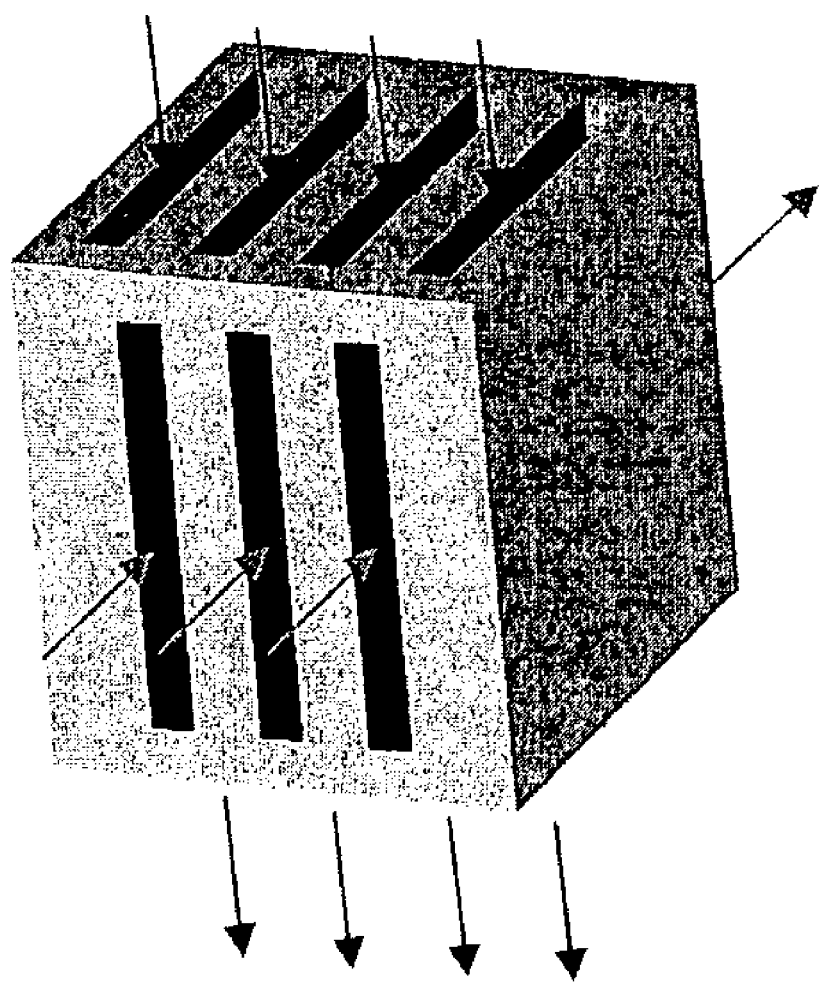
FIG. 1 illustrates a cross-flow microchannel reactor. In some preferred embodiments, catalysts are placed in the process channels as either a coating, an insertable felt or foam, or packed powders. In this illustration, a heat exchange fluid is flowing downward while a process stream flows in the direction that is into the page. The heat exchange fluid could alternatively be oriented as co-flow or counter-flow.

The invention preferably uses a microchannel reactor. Microchannel reactors are characterized by the presence of at least one reaction channel having a (wall-to-wall, not counting catalyst) dimension of 5 mm (preferably 1 mm) or less, and in some embodiments 50 to 500 µm. Both height and width are perpendicular to the direction of flow. The height and/or width of the reaction microchannel is preferably 5 mm or less, and more preferably 1 mm or less (in which case the reaction chamber falls within the classical definition of a microchannel). The length of the reaction channel is typically longer. Preferably, the length of the reaction chamber is greater than 1 cm, more preferably in the range of 1 to 20 inches (2.5 to 50 cm). Typically, the sides of the reaction channel are defined by reaction channel walls. These walls are preferably made of a hard material such as a ceramic, an iron based alloy such as steel, or monel. More preferably, the reaction chamber walls are comprised of stainless steel or inconel or other alloy which is durable (capable of withstanding high temperatures while supporting high pressures inside the reactor for long periods of time) and has good thermal conductivity.

Reaction channels that contain post-like supports or baffles are considered a single channel while channels with a support rib running the entire channel length are considered two channels. Reaction channels that are "separated" by a porous material are also considered two channels.

The reactors preferably include a plurality of microchannel reaction channels and/or a plurality of adjacent heat exchange microchannels. The plurality of microchannel reaction channels may contain, for example, 2, 10, 100, 1000 or more channels. In some preferred embodiments, the microchannels are arranged in parallel arrays of planar microchannels. Layers of reaction channels can be alternated with layers of heat exchange channels (or layers of exothermic reaction channels alternated with layers of endothermic reaction channels) or two layers of reaction channels sandwiched between heat exchange layers, etc. During operation, the heat exchange microchannels contain flowing heating and/or cooling fluids. Flows between layers can be co-flow, counter-flow, cross-flow or a combination of lows (diagonal flow). Channels within a single layer can be also co-flow or counter flow. Non-limiting examples of this type of known reactor usable in the present invention include those of the microcomponent sheet architecture variety (for example, a laminate with microchannels) exemplified in U.S. Pat. Nos. 6,200,536, 6,192,596 and 6,219,973 (both of which are hereby incorporated by reference). Performance advantages in the use of this type of reactor architecture for the purposes of the present invention include their relatively large heat and mass transfer rates, and the substantial absence of any explosive limits. Use of microchannel reactors can achieve better temperature control, and maintain a relatively more isothermal profile (or, in some embodiments, a well-controlled temperature gradient), compared to conventional reactors.

In some embodiments, the reaction microchannel (or microchannels) contains a "bulk flow region" or an open flow path. The terms "open flow path" or "bulk flow region" refer to an unobstructed, contiguous bulk flow region within the reaction chamber. A contiguous bulk flow region allows rapid gas flow through the reaction chamber without large pressure drops. In preferred embodiments there is laminar flow in the bulk flow region. Bulk flow regions within each reaction channel preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably 30-80% of either 1) the internal volume of the reaction chamber, or 2) the cross-section of the reaction channel. Flow patterns as well as flowrate can be tailored to achieve desired temperature gradients within the reaction channels along the flow direction. Heat transfer fluids may include any known heat transfer fluids, such as water, aqueous solutions, silicone oils, molten salts, liquid metals, etc. In some preffered embodiments, the heat exchange fluid is steam or is a fluid that undergoes a phase change in the heat exchanger under the intended process temperatures.

In addition to the reaction chamber(s), additional features such as microchannel or non-microchannel heat exchangers may be present. Microchannel heat exchangers are preferred. Less preferably, conventional heat exchangers may be attached to the microchannel reactor by conventional piping and adapters. Microchannel heat exchangers can be integral to the reactor, i.e., they can be formed as one continuous unit with the reactor. In some preferred embodiments, a reactant stream is preheated by the reactor, this preheated stream then flows into the reactor and/or the product stream from the reactor can transfer heat to the reactant stream—in these embodiments, fluids flow between a heat exchanger and the reactor. The heat exchanger can be incorporated into the microchannel reactor in the form of a pre-heat zone. Heat exchangers can exchange heat between the process stream and a separate, hot or cold heat exchange fluid stream (typically the streams are separated by a wall or walls of a microchannel), or they can exchange heat between the inlet and outlet streams, or both. In some embodiments of the inventive reactor or method, the reactor (or method) is configured to send the product stream into a second reactor or recycle the product stream back into the same reactor. The heat exchange fluids can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels (for example, at least 10 heat exchangers interleaved with at least 10 reaction microchannels).

Many options exist for the design of a microchannel reactor. In some embodiments, a coolant fluid flows in microchannels adjacent to the reaction chamber. The flow of coolant may be cross flow, counter-flow or co-flow. Heat transfer fluids may include any known heat transfer fluids, such as water, aqueous solutions, silicone oils, molten salts, liquid metals, gases, etc. In some preferred embodiments, the heat exchange fluid is steam or is a fluid that undergoes a phase change in the heat exchanger or reactor under the intended process temperatures.

In an alternate microchannel embodiment, a reactant or reactants could be staged or fed sequentially into the reaction mixture. The staging could occur in separate devices, through the use of small orifices or jets within one device, or from a microporous membrane or alternate sparging sheet. In oxidative dehydrogenation, for example, staged oxygen addition lowers the local oxygen partial pressure and thus favors the desired partial oxidation reaction over the competing and undesired combustion reaction.

An alternate microchannel design is the coupling of an exothermic and an endothermic reaction in adjacent reaction chambers, preferably adjacent microchannels. The placement of an endothermic reaction such as a steam reforming reaction next to the exothermic reaction allows for the highest rate of heat transfer. In some embodiments, an endothermic reaction such as steam reforming is conducted in one reaction microchannel while an exothermic reaction such as combustion is conducted in an adjacent microchannel or in another microchannel that is in a heat-exchange relationship in a multi-stream integrated heat exchanger/reactor. In some preferred embodiments, a reaction channel contains multiple reaction zones such as a first reaction zone with a first catalyst followed by a second reaction zone with a second catalyst— two separate and distinct catalysts are not considered a graded catalyst, but the first and/or second catalysts could be graded catalysts. Where two separate and distinct catalysts are employed, it is often desirable to operate the catalysts at different temperatures. For combustion reactions, it is sometimes desirable to conduct a partial oxidation followed by a complete oxidation—this is especially useful where a partially oxidized fuel has better reaction properties than the nonoxidized fuel.

A nonlimiting example of microchannel reactor hardware is shown in FIG. 1. Coolant microchannels (5 mm, and preferably 2 mm or less) are adjacent to a microchannel reaction chamber (5 mm, and preferably 2 mm or less). The wall between the channels is preferably 2 mm or less. The flow of coolant may be oriented in a co-current flow, counter-current flow, or cross-current flow. The length of the process flow channel may be any length, but a typical range is 1 to 20 inches (2.5 to 50 cm). The height of the process channel may also be any value, but a typical range is 0.1 inches to 10 inches (0.25 to 25 cm). Each of the process or coolant channel may be further subdivided with parallel subchannels. The spacing of subchannels is dependent upon maximizing heat transfer and minimizing mechanical stresses. Pressure drop considerations are also important for choosing channel spacing, length and width/heights.

At a point where the chamber height or the chamber width is about 5 mm or less, the chamber height and the chamber width define a cross-sectional area. In some preferred embodiments, the cross-sectional area comprises a porous catalyst material and an open area, where the porous catalyst material occupies up to 95%, preferably 5% to 95% of the cross-sectional area and where the open area occupies at least 5%, preferably 5% to 95% of the cross-sectional area. In some preferred embodiments, the open area in the cross-sectional area of a single channel occupies a contiguous area of $5 \times 10^{-8}$ to $1 \times 10^{-2}$ $m^2$.

In some embodiments, the reactor may have a reaction channel with a cross-sectional area that varies along its length, such as described in U.S. patent application Ser. No. 10/153,577; incorporated by reference herein as if reproduced in full below. The variable cross-section, which permits control of local contact time, can (in some preferred embodiments) be combined with a graded catalyst as described herein. For example, the catalyst can be graded with the highest concentration of catalytically active material in the outlet side (or, conversely, on the inlet side) of the reaction channel and a reaction channel of gradually increasing cross-sectional area with the largest cross-section on the outlet side (or, conversely, gradually decreasing cross-sectional area with the largest cross-section on the inlet side) of the reaction channel—thus enhancing control of reaction conditions.

Methods of Making Apparatus

The inventive reactors can be fabricated using methods such as lamination of thin metal sheets (where a reaction channel can be within one sheet, for example, the channel can be etched in a sheet or stamped through a sheet with reaction channel walls provided by adjacent sheets, or a reaction channel can be made up of multiple sheets), micro-EDM drilling, laser machining, chemical etching, injection molding, welding. Materials like metal, alloys, composite, polymers, and ceramics can be utilized. Highly conductive material will enhance heat transfer efficiency and mitigate non-uniformity of temperature distribution. Preferably, at least a portion of a wall or walls of the reaction channel are composed of a thermally-conductive material such as steel or aluminum. For devices made from laminated devices, it can be desirable to stamp reaction channels into a sheet or sheets. Devices fabricated from such sheets will typically have a reaction channel in a single sheet or multiple adjacent sheets (preferably sandwiched between layers of heat exchangers), so that the assembled device will have reaction channels with constant heights as defined by top and bottom sheets defining the top and bottom of a reaction channel.

Catalysts

For many of the inventive embodiments, a catalytically-active material is present. In various embodiments, (a nonlimiting list of) the catalytically-active materials of the present invention may include: the noble metals including Au and Ag, base metals including Fe, Co, Cu, and Ni, , catalyst materials comprising at least one metal selected from the group consisting of Pt, Pd, Os, Rh, Ir, Re and Ru; and/or at least one oxide or salt of a metal selected from the group consisting of Li, Mo, V, Nb, Sb, Sn, Zr, Cr, Mg, Mn, Ni, Co, Ce, Al, Fe, rare-earth metals and mixtures thereof. The catalyst may contain additional components such as promoters, for example, alkali or alkaline earth promoters. Preferred support materials include alumina, silica, titania, zirconia, ceria, other metal oxides or mixtures of these oxides, mesoporous materials and refractory materials, carbon or silicon carbide. Catalysts can be, for example, vanadia dispersed on alumina, or platinum on alumina. Catalysts can also be a noble metal dispersed on a metal oxide layer that is coated on (such as by wash coating or chemical vapor deposition) a metal foam or metal felt (nonwoven metal). In some preferred embodiments, catalyst is disposed (such as by CVD or wash coating) on a wall or walls of a microchannel.

Catalysts employed in the reaction channels are preferably solids (or contain solids) for heterogeneous reactions that, under the selected reaction conditions, remain (at least partly) as heterogeneous material, that is, the catalyst does not completely dissolve in the process stream. Preferably, the catalyst is essentially insoluble in the process stream. The catalyst may be utilized in a flow-by (such as a coating or thin layer) or flow through (substantially occupying an entire cross-section of the reaction channel) configuration. Examples of catalyst structures include: foams, felts (nonwoven fibers), screens, pellets, saddles, powders, honeycombs, aligned or nonaligned carbon nanotubes and coatings. In some preferred embodiments, the catalyst is an engineered catalyst. Any of these structures can have multiple layers such as a buffer layer, interfacial layer(s), and a layer or layers containing a catalytically active metal. The catalyst may contain a single type of material, but more typically will contain multiple materials such as a support and metal or multiple metals, promoters, or mixtures of supports, metals, etc. The catalyst may be a fluidized bed or a fixed bed.

In some preferred embodiments, the invention utilizes a porous catalyst, the porous catalyst having a length, a width and a thickness, the porous catalyst defining at least a portion of at least one wall of a bulk flow path. In this preferred embodiment, the surface of the catalyst defines at least one wall of a bulk flow path through which the reactant and product mixture passes. During operation, a reaction mixture flows through a reaction chamber (preferably a microchannel), past and in contact with the porous catalyst.

In some preferred embodiments, the porous catalyst is provided as a porous insert that can be inserted into (or removed from) each channel in a single piece; preferably the porous insert is sized to fit within a microchannel with a width of less than 2 mm. The inserts can be made with any desired size, and in some embodiments have one dimension of 2 mm or less and one dimension of 1 cm or more. In some embodiments, the porous catalyst occupies at least 60 volume %, in some embodiments at least 90%, of a cross-sectional area of a microchannel; this volume % includes pores within a monolith and interstitial spaces between particles. In another alternative, the catalyst can be provided as a coating (such as a washcoat) of material within a microchannel reaction channel or channels. The use of a flow-by catalyst configuration can create an advantageous capacity/pressure drop relationship. In a flow-by catalyst configuration, gas preferably flows in a 0.1-1.0 mm gap adjacent to a porous insert or a thin layer of catalyst that contacts the microchannel wall (preferably the microchannel wall that contacts the catalyst is in direct thermal contact with a heat exchanger, preferably a heat exchange stream contacts the opposite side of the wall that contacts the catalyst). Another inventive embodiment is combinations of engineered catalysts, wall coatings and/or powders all in one channel. For example, there may be a catalyst on a foam at the front of a channel and a second catalyst (where the catalyst have the same or different elemental composition) in powder form downstream of it; the same catalyst can be used in two forms—this would be another way to form a graded bed.

A "porous catalyst material" (or "porous catalyst") refers to a porous material having a pore volume of 5 to 98%, more preferably 30 to 95% of the total porous material's volume. At least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions. The porous material can itself be a catalyst, but more preferably the porous material comprises a metal, ceramic or composite having a layer or layers of a catalyst material or materials deposited thereon. The porosity can be geometrically regular as in a honeycomb or parallel pore structure, or porosity may be geometrically tortuous or random. Preferably the substrate is a foam metal or foam ceramic. The catalyst layers, if present, are preferably also porous. The average pore size (volume average) of the catalyst layer(s) is preferably smaller than the average pore size of the substrate. The average pore sizes in the catalyst layer(s) disposed upon the support preferably ranges from $10^{-9}$ m to $3 \times 10^{-7}$ m as measured by $N_2$ adsorption with BET method. More preferably, at least 50 volume % of the total pore volume is composed of pores in the size range of $10^{-9}$ m to $10_{-7}$ m in diameter. Diffusion within these small pores in the catalyst layer(s) is typically Knudsen in nature for gas phase reactions, whereby the molecules collide with the walls of the pores more frequently than with other gas phase molecules.

Catalysts or catalyst supports preferably have good thermal conductivity. In some preferred embodiments, the catalyst comprises a support such as a metal, metal alloy, carbon, carbide, sulfide, nitride, polymer, ceramic or mixture of these. Particularly useful examples are alumina, zirconia, silicon carbide, aluminum nitride, carbon, ceria, titania, Ag, Co, Au, Cu, Zn, Ni, or mixture of these. In some preferred embodiments, Ag, Co, Au, Cu, Zn, or mixture of these are mixed with less than 50% by volume of a metal oxide such as alumina, silica, titania, zirconia, ceria, or mixtures of these. Perovskites are particularly useful as catalyst supports or coatings on supports. ABO(3-x) perovskites are expected to be particularly useful in oxidation processes such as combustion where their oxygen absorption and desorption characteristics can benefit catalyst activity and stability. In the formula, element A is selected from a group consisting of a Group II metal, calcium, strontium, barium, yttrium, lanthanum, a lanthanide series metal, an actinide series metal, and a mixture thereof. Element B is selected from a group consisting of iron, manganese, chromium, vanadium, titanium, copper, nickel, cobalt, and mixtures thereof. Perovskites are well-known materials and are discussed in texts such as Wells, "Structural Inorganic Chemistry," Oxford Science Publications.

Figure 5:
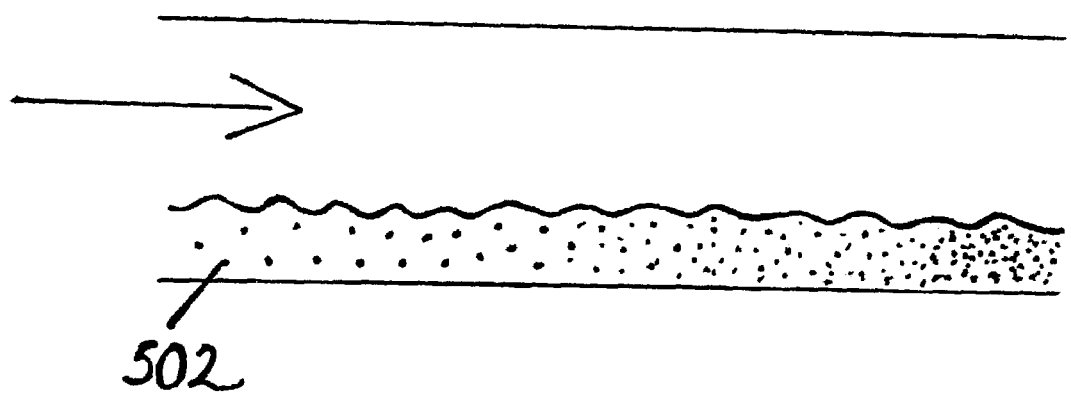
FIG. 5 schematically illustrates a lengthwise cross-sectional view of a reaction channel containing a graded catalyst.

In some preferred embodiments, the invention uses a graded catalyst that has a varying density of catalytically active sites. Gradients can be arranged in any desired configuration. For example, gradients can be arranged with the greatest density of catalytically active sites in the center of a reaction microchannel, near a microchannel wall, or in the front (near an inlet) of a reaction microchannel. In some preferred embodiments, the concentration of catalytically active sites is least at the front 502 (that is, the region of a microchannel that contains catalyst that is nearest an inlet for reactants) of a reaction microchannel and increases along the length of the microchannel. One such variation of this "back to front" configuration is illustrated in FIG. 5. The "back to front" configuration is especially desirable for reactions in which it is desired to have an equal amount of reaction over the length of the microchannel and where the concentration of the reactants can vary significantly over the length of the microchannel. This may be desirable, for example, to reduce hot spots in an exothermic reaction.

In some preferred embodiments, the invention uses a graded catalyst wherein the physical form varies over the length or width of the reaction microchannel. For example, the thermal conductivity of the substrate material may be varied by location to take advantage of different local rates of reaction, which will respond different to varying local exotherms or endotherms.

Figure 6:
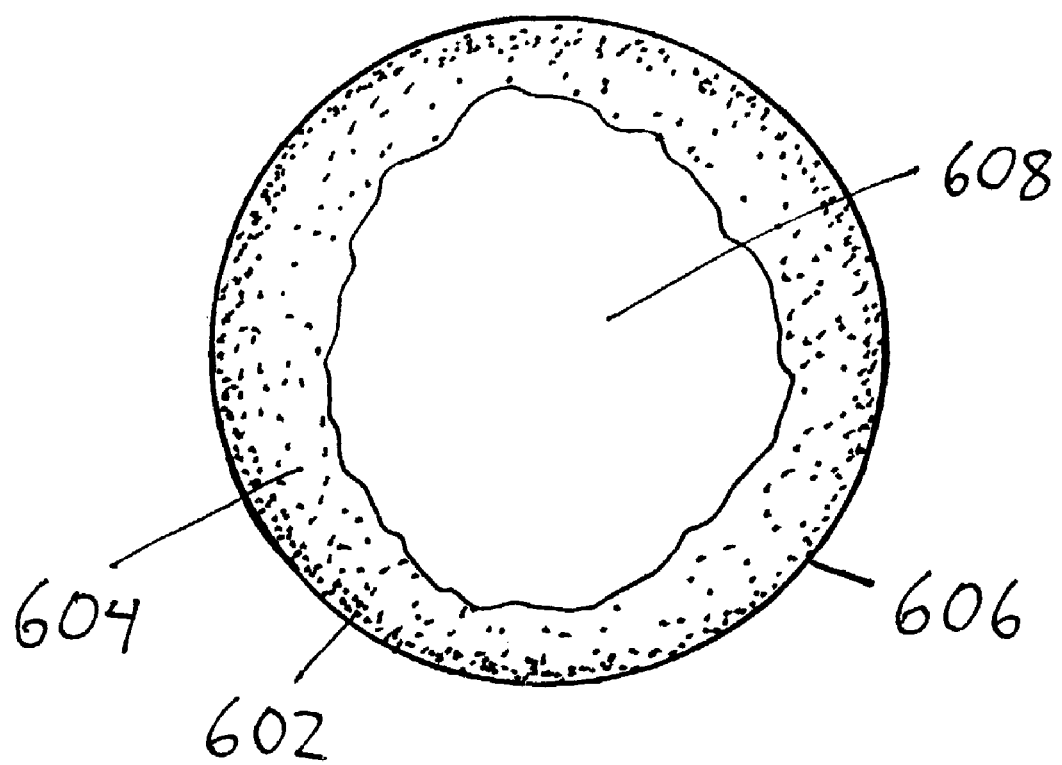
FIG. 6 schematically illustrates a cross-sectional view of a reaction channel containing a graded catalyst having a relatively high concentration of active catalyst near the channel wall.

In some preferred embodiments, the density of catalytically active sites is greatest near the microchannel walls. See, for example, FIG. 6 where black dots 602 indicate catalytically active sites in porous catalyst 604. In this cross-sectional view, there is an open bulk flow region 608. This type of configuration is especially advantageous where the microchannel wall 606 contacts a heat exchanger (not shown). In some preferred embodiments, the walls are in direct contact with a heat transfer fluid. In addition to catalyst site density, graded catalysts can also include catalysts of varying compositions or catalysts with varying turnover rates.

Graded catalysts can be utilized either in a flow-by configuration (FIGS. 5 and 6) or in a flow-through configuration (not shown) where catalyst substantially fills a reaction microchannel.

In some embodiments, catalyst particles are hollow or porous (as defined above). Hollow particles are substantially hollow in the center of the particles—these are not merely rim-type catalyst particles with catalyst metal on the exterior of a catalyst particle, rather, these particles preferably have substantially no support material in the particle core; in other words, the particle core is substantially empty. Preferably, hollow or porous particles have a mass average particle size (as measured by sieving for larger particles or electron microscopy for smaller particles) that is in the range of 1 and 40% of the largest diameter of a cross-section of a reaction microchannel, more preferably in the range of 1 and 25%, and in some embodiments 5 to 20%, of the largest diameter of a cross-section of a reaction microchannel. In some preferred embodiments, at least 50% (by mass) of the catalyst particles are in the size range of 1 to 300 µm. Particle sizes in these ranges are advantageous in ease of loading into microchannels and in generating turbulent flow around the particles. Particles of these sizes can be readily made by processes such as spray drying or spray pyrolysis.

In another preferred embodiment, the catalyst comprises tubes (hollow fibers). These tubes preferably have an aspect ratio of at least 2, more preferably at least 10. Preferably, at least 50% (by mass) of the tubes have an external diameter in the range of 1 to 20 µm.

Methods of Making Catalysts, Supports and Composites

In some embodiments of the invention, catalysts can be made by known processes or purchased from commercial sources. An example of catalyst preparation is found in U.S. patent application Ser. No. 09/492,950, now U.S. Pat. No. 6,440,895, incorporated herein by reference. Some known methods of forming a graded catalyst are described by Dalla Betta et al. in U.S. Pat. No. 5,248,251, incorporated herein by reference. Among other techniques, graded catalysts can be formed by spraying an active component on the surface of a support. Graded catalysts can also be formed by dipping a microinsert or a microreactor apparatus with open reaction channels (or partly dipping a microinsert or microreactor to immerse only a portion of the length of the microinsert or channel length) into a catalyst coating solution or slurry.

Figure 4:
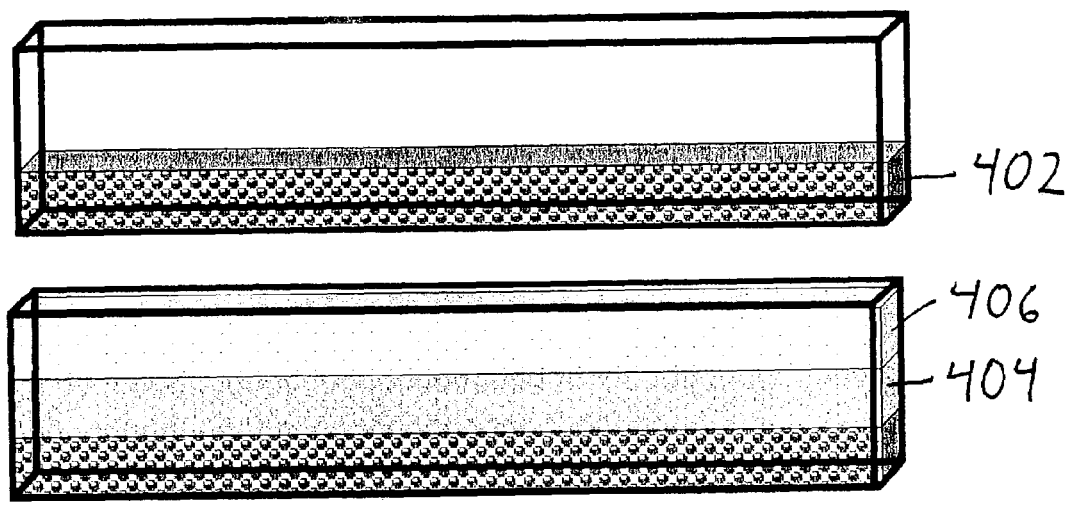
FIG. 4 schematically illustrates the formation of a graded insert in a mold. The figure shows a microchannel preform filled with a first catalyst layer (top) and the preform filled with two more catalyst layers (bottom). The catalyst layers can vary in composition, particle size, density, etc.

In a novel method of the present invention, a microinsert catalyst or microinsert catalyst support is prepared by using a microchannel as a mold. In this method, a powder, liquid or slurry precursor composition is added to a microchannel; this precursor composition is reacted, such as by heating, to form a solid microinsert catalyst or solid microinsert catalyst support. The mold can be sized to form inserts of desired dimensions—for example, one preferred mold has a width of 5 mm or less, more preferably less than 2 mm. If desired, the resulting microinsert can be additionally treated, for example coated (e.g., wash-coated and/or coated by vapor deposition) or sintered, either in the mold and/or in the microchannel reactor. Optionally, the microchannel mold can be made of (or lined with) a release material such as Teflon®. In another embodiment, the microchannel mold is made of a material that dissolves or degrades—leaving the microinsert catalyst or microinsert catalyst support. A graded catalyst could be made in a mold by layering in layers of varying catalytic activity (that is varying catalytic activity in the final catalyst after any sintering and/or activation steps)— see FIG. 4. For example, a graded catalyst can be made by putting a less active catalyst in a mold followed by a more active catalyst; more generally, a first type of catalyst 402 that partially fills a mold is followed by a second type of catalyst 404 (optionally followed by a third type 406, etc.). In a variation of this technique, a preform is made by putting more active material in a binder and partially filling a mold, then additional layer(s) are added of less active material. The binder can be a wax or any substance that can be easily be removed (such as by burning or dissolving) without damaging the catalyst and which fixes the particles into a spatial relationship that is largely maintained after the binder is removed.

In another technique, at least two different types of particles are introduced in a microchannel mold or reaction microchannel. One type contains a catalytically active material and the other type contains a lower concentration (or none) of the catalytically active material; the relative quantities of each type of particle can be varied to produce a graded catalyst. Another good way to form a graded bed is to load a bed with layers of progressive larger or smaller particle sizes; even if the particles all have the same metal loading, the smaller particles will pack more densely, resulting in a higher metal concentration in the smaller particle layers. There is also a secondary advantage of varying the particle diameter down the length of the bed; doing so effectively changes the hydrodynamics in the bed, resulting in a change in the bed porosity. For some reactions such as Fischer Tropsch, there are also mass transfer (interparticle) reasons to do this.

The techniques discussed herein can be used to form a catalyst or matrix in a microchannel either to form a microinsert or to form a catalyst, matrix or composite in situ. In this invention, a carbon-based, metal-containing, ceramic, or other matrix can be formed in a microchannel and used, for example, as a catalyst support, mixing device, or heat transfer mechanism. A material formed in situ can have excellent physical contact with a microchannel wall. In addition, if a flow-through configuration is desired, the material can completely fill the microchannel (except for pores in the material) regardless of the uniformity of the channel dimensions, thus mitigating potential by-pass of flow along channel walls.

In one embodiment of the invention, a matrix is formed by mixing carbon fibers, a carbonizable organic powder and a rigidizer to form a slurry. The slurry can then be placed into a microchannel using vacuum techniques to ensure complete filling of the microchannel. The carbon material can then be dried (for example at about 50° C.), and then pressure and heat treated (for example, 200 to 2000 pounds per square inch (psi) of an inert gas and 130° C. to 400° C.). The resulting matrix can then be carbonized, for example, by treatment at 650° C. or more in an inert environment. Some conventional examples of forming carbon fibers and composite materials that can be adapted for use in microchannels. Examples of conventional methods are provided in U.S. Pat. Nos. 5,334,414 and 5,744,075, which are both incorporated herein as if reproduced in full below.

In another embodiment of the invention, a matrix precursor is formed by mixing a catalyst alloy of a Raney metal and a leachable material (for example, Co and Al), a powder of an active metal (for example, Co), optionally a pore former (e.g., wax spheres), and optionally a wetting agent (e.g., water). This mixture is introduced into a microchannel, and, preferably, fills a reaction zone within the microchannel. The resulting composition can be dried and then the pore former removed by calcinations. An example of a conventional method that can be adapted to a microchannel environment is described in U.S. Pat. No. 5,536,694 which is incorporated herein as if reproduced in full below.

The invention also provides methods of orienting particles (such as support particles or catalyst particles) in a microchannel using an applied electric or magnetic field. For example, magnetic particles in a microchannel can be oriented with respect to the magnetic field and/or drawn to the walls of the microchannel. In a preferred embodiment, a graded catalyst is prepared in which one type of particle is magnetic (while the other type is less magnetic or nonmagnetic) and the particles are introduced into a reaction microchannel under the influence of a magnetic field (meaning that the walls of the microchannel are magnetized or that an external magnetic field is applied). Orientation can be conducted on catalyst particles or on particles (such as support particles) that are subsequently treated to form catalyst particles.

In another method, high aspect ratio catalysts or catalyst supports are grown on a wall or walls of a reaction microchannel. This may be done under the influence of a magnetic field in which a magnetic precursor material is drawn to a microchannel wall; for example, iron flakes or rods can be aligned in a microchannel, sintered and then used as a catalyst support (followed by any desired steps of sintering and/or coating of high surface area layers and active catalyst material). Similarly electroplating or electroless plating can be used to grow dendritic whiskers or fibers in direct contact with a wall of a microchannel. In this case, the microchannels can be filled with an electrolytic solution which contains dissolved catalyst constituents; upon application of an electric potential between the channel walls and the solution, certain catalytic constituents can be preferentially plated onto the channel walls. In electroplating, the microchannels are filled with a solution and subjected to an electrical field wherein ions from the solution are attracted to the wall and deposited thereon. In electroless plating a solution of the metal and a reducing agent is introduced into the microchannel and permitted to react so as to deposit the reduced metal on the microchannel wall. Often the electroless plating process is preceded by deposition of a small amount of a nucleating agent or catalyst that facilitates the reduction of the metal from ions to metal. These configurations can be particularly advantageous because the intimate attachment of catalyst to the microchannel wall enhances heat transfer. In some preferred embodiments, high aspect ratio, thermally conductive particles are oriented in a direction within a microchannel that is substantially perpendicular to flow and in contact with a microchannel wall—thus enhancing thermal transfer.

In another embodiment, walls of a reaction microchannel are etched to form a porous catalyst support. Similar to the techniques described above for catalyst formation in molds, catalysts (including graded catalysts) can be formed in situ in microchannels by techniques such as sintering particles. In some other embodiments, catalysts can be deposited on the walls of microchannels using electrochemical deposition.

For use in catalytic applications, matrices (including graded matrices) can be treated in one or more steps to generate a catalytic (or more catalytic) surface. Such steps include: etching, chemical or plasma vapor deposition, wash coating, impregnation, precipitation, leaching, etc. For use as a mixing or heat transfer device, the matrix can be used directly or with further treatment to enhance desired physical properties such as passivation, etching, coating, etc.

Methods of Loading Microchannels

When subsequent manufacturing steps won't destroy a catalyst, a catalyst can be formed in a microchannel by techniques such as by wash coating, sol-gel processing, chemical vapor deposition, etc. Also, relatively large particles such as pellets or monoliths can be dropped or slid into microchannels. In many cases where bonding or laminating conditions won't destroy the catalyst, catalyst components can be placed or formed in a partly assembled device, or catalyst can be rejuvenated after bonding (or maybe the catalyst preparation isn't completed until after bonding—that is, a catalyst precursor is loaded into the partly assembled device); for example deposited on a sheet before the sheet is bonded into a laminated device.

For any of fabrication methods mentioning catalyst particles it should be observed that such particles may include catalyst precursor particles that could be activated after loading into a microchannel.

Relatively small particles such as powders (for example, particles having at least one dimension of 150 μm or less, in some embodiments particles having at least one dimension of 100 μm or less, and in some embodiments particles having no dimension of 50 μm or more) can be difficult to load into a microchannel due to static electricity or wind or air currents and catalyst particles can be lost or drift into undesired locations. According to some preferred embodiments, a magnetic field is applied to a microchannel or microchannels and catalyst particles are loaded under the influence of the magnetic field. Preferably the catalyst particles are magnetized or are ferromagnetic. Similarly, in some preferred embodiments, catalyst particles can be loaded into a microchannel that has an electric potential; in some preferred embodiments the catalyst particles are charged, however, in many cases particles are sufficiently polarizable that the particles need not be charged. Alternatively, small catalyst particles can be prepared in a sol form and coated or loaded into a microchannel using sonication.

Figure 3A:
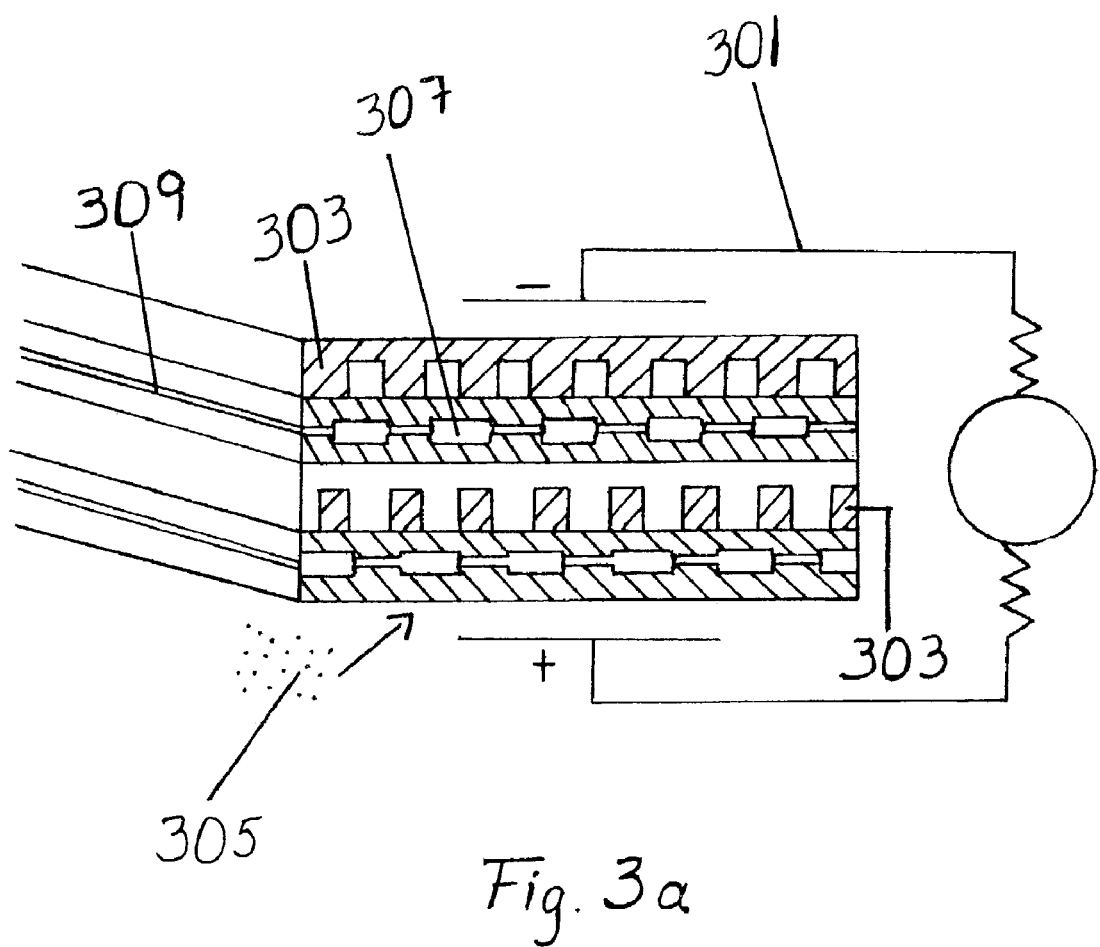
FIG. 3a schematically illustrates powder loading into a microchannel reactor under the influence of an electric field.
Figure 3B:
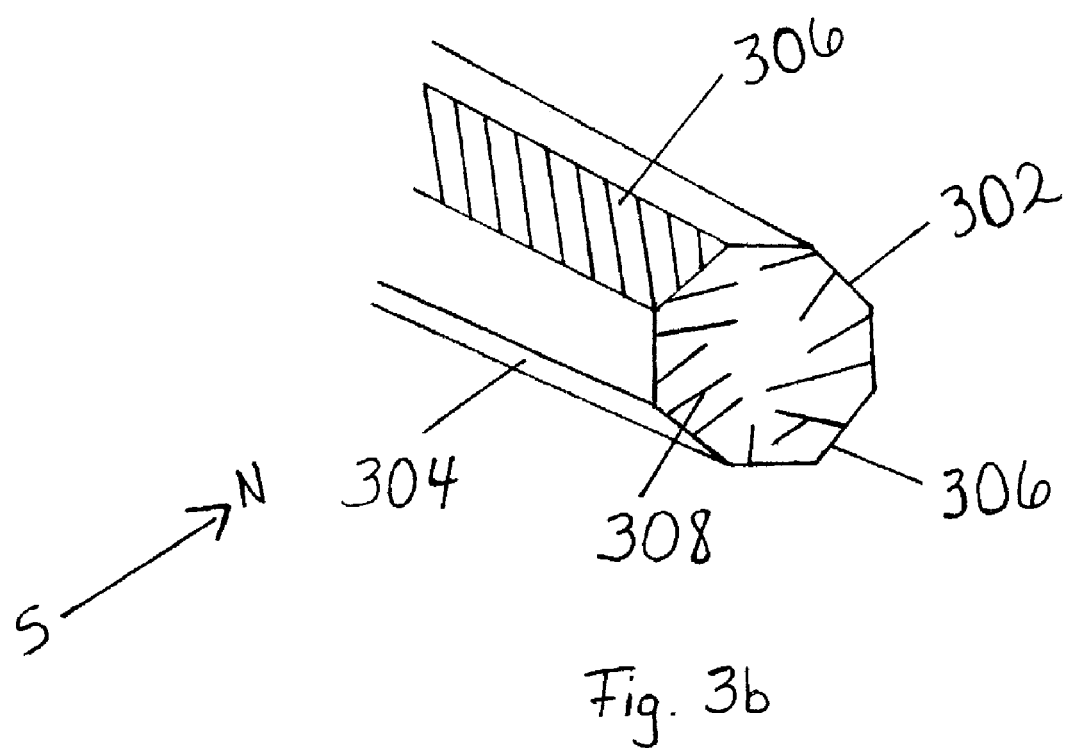
FIG. 3b schematically illustrates a channel having anisotropic particle loading in the presence of a magnetic field.

In addition, or alternatively, to loading particles, magnetic or electric fields can be used to orient particles within a microchannel. For example, particles can be loaded (either with or without a magnetic or electric field) into a microchannel and subsequently oriented under a magnetic or electric field. In preferred embodiments, particles with aspect ratios greater than 1.1 preferably greater than 3, more preferably greater than 10, hereinafter known as "high aspect ratio particles") are oriented in a microchannel such that the longest axes of the particles are substantially perpendicular (within 10 degrees) to the channel walls—in preferred embodiments, at least 50% of the high aspect ratio particles, more preferably at least at least 80% of the high aspect ratio particles are substantially perpendicular to the channel walls. In especially preferred embodiments, these particles contact the channel walls and thus conduct thermal energy between the microchannel walls and the inside of the reaction channel. A schematic example of particle loading under the influence of an applied electric field 301 is illustrated in FIG. 3*a*. Catalyst particles 305 are loaded into reaction channels 307 under the influence of the applied field. In the illustrated embodiment, reaction channel layers are interleaved between microchannel heat exchangers 303. In the illustrated embodiment, an insulating layer 309 is present. One schematic example having oriented particles is illustrated in FIG. 3*b* which shows a microchannel having walls 302, 304, 306. Rod-like catalyst particles 308 are oriented within the microchannel in substantial conformity with the applied magnetic field indicated by the arrow.

High aspect ratio particles can have a catalyst gradient along the length of the particle. In some preferred embodiments, the high aspect ratio (catalyst gradient) particles are polarized and oriented within a reaction channel such that a majority of particles (at least 60%) are oriented with the particles' ends having a greater amount of active catalyst metal near a microchannel wall and the end with a lesser amount of active catalyst metal near the center of a reaction channel. In some embodiments, high aspect ratio polarizable particles (with or without a graded catalyst) are oriented within a microchannel; preferably so that at least 50% (by mass), more preferably at least 75%, of the particles are oriented within a microchannel such that their central axes are parallel within 10 degrees. In some preferred embodiments, particles are oriented within a microchannel under the influence of a magnetic field and the particles (including precursor particles such as metallic catalyst supports) are sintered to freeze the particles in place so that the magnetic field can be removed without losing particle orientation. High aspect ratio particles are particles having a height to width ratio of at least 3 (more preferably at least 10); where height is the largest dimension and width the smallest dimension that is perpendicular to height; "smallest dimension" refers to a dimension such that the particle can fit through a hole of a screen of a given dimension—for needles this screening can provide accurate width measurements, for platelets the width is more typically measured by microscopy.

In some preferred embodiments, devices, such as that illustrated in FIG. 3*b*, can be made by stacking sheets and bonding, gluing or pressing to keep the sheets together. In some preferred embodiments, the particles 308 could be fixed in place such as by heating to sinter particle tips to a microchannel wall. The catalyst particles can be coated with a catalyst or interfacial layer either before or after loading the particles in a reaction channel. In some preferred embodiments, the particles are coated with a low melting (relative to the microchannel walls) material that softens and adheres the particles to the channel walls.

In another embodiment, after introduction of the catalyst particles they are fixed or attached to the wall in situ. This attachment can be accomplished by coating the catalyst particles with a thin film of a material that forms a strong bond to the microchannel wall and to the particles. This process optionally can be performed using the catalyst support and the active catalytic materials can be added in a further step. The coating step can be accomplished by electroless plating or electroplating. In one preferred embodiment the coating material is deposited as a metal or alloy that has a high conductivity to facilitate heat transfer between catalyst and microchannel wall. In another embodiment the coating can be chemically or thermally treated to transform a low thermal conductivity material to a higher thermal conductivity material, such as by reduction or partial reduction of the material.

Methods of Removing Catalyst

Due to the small dimensions of microreactors, catalyst replenishment can be a costly and formidable challenge. One method of removing catalysts from microchannels is to conduct a different type of reaction such that either the energy released is high enough to decompose the catalyst or its support, or decompose part of the catalyst structure such that the overall catalyst structure collapses and can be readily removed from the channel by a process such as suction, flushing, rinsing, or further chemical reaction. Another method of removing a catalyst is to introduce a corrosive liquid that dissolves the catalyst but does not attack the reactor. Catalyst removal could require multiple steps such as a combustion reaction followed by an acid wash.

Flow Disruptors and Micromixers

Figure 2:
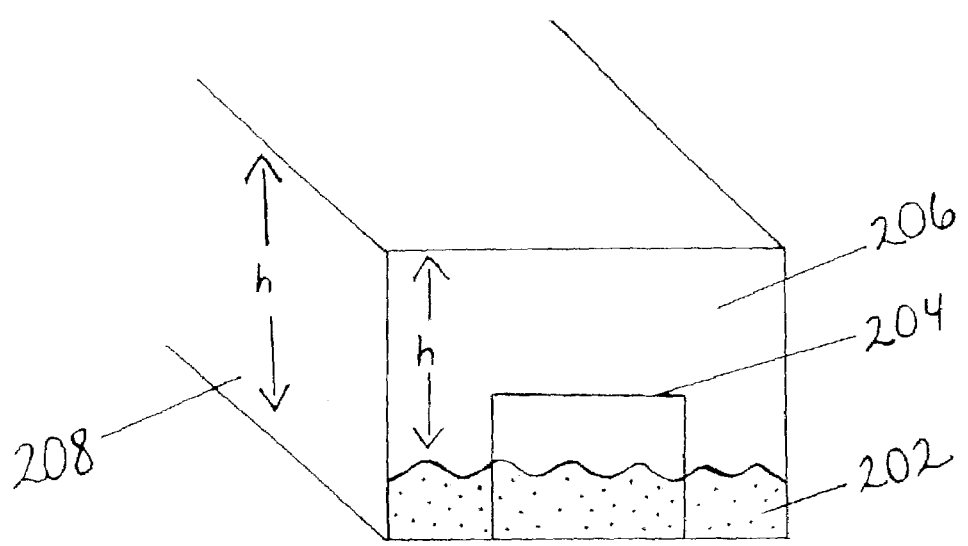
FIG. 2 is a schematic illustration of a cross-section of a reaction microchannel containing a flow disruptor 204.

A flow disrupter is a component disposed in the open flow path over a catalyst. The flow disruptor is in the open flow path at a point wherein the open flow path has at least one dimension of 5 mm or less. The flow disruptor converts laminar or transitional flow to turbulent flow. The flow disrupter occupies less than about 20%, and preferably less than 10% of the volume of the open flow path. A simple "vertical" post that provides structural support is not a flow disruptor (on the other hand, a "vertical" post with horizontal fins can be a flow disruptor). Also, according to the present invention, posts or wires that function to retain catalyst do not qualify as flow disruptors. In one preferred embodiment, illustrated in FIG. 2, the flow disruptor 204 is a bar. While a straight bar is depicted, it should be appreciated that the disruptor may take other shapes such as corkscrew, barbed wire, etc. The flow disrupter is depicted as a wire (which is preferable in some embodiments), but can be a strand or other material. The flow disruptor is disposed over catalyst 202. The catalyst can be any suitable form including, but not limited to, washcoat, vapor deposit or monolithic insert. The microchannel 208 has a height h. The height h' of open flow path 206 is less than 5 mm. There may be a single flow disrupter in a reaction microchannel, or there could be multiple disruptors such as at least 2, 5, 10 or more. While the figure illustrates a flow disrupter that has supports projecting from the catalyst, it should be appreciated that supports for the disruptors need not contact the catalyst. Flow disruptors could also be posts or other projections (that do not provide structural support) that cause turbulent flow. The flow disruptors could also be unsupported inserts such as a spiral winding inserted into a reaction channel. In some preferred embodiments, the disruptors are noncatalytic (i.e., they do not catalyze the chemical reaction being run or intended to run in the apparatus), although catalytic flow disruptors could have catalytic activity. Of course, a "flow disruptor" should not be interpreted as merely catalyst particles, pellets, coatings, foams, wads, felts or honeycombs loaded in a reaction channel. A flow disrupter could be coated or otherwise treated to enhance its chemical stability, compatibility, or activity for the desired reaction.

In another preferred embodiment, the flow disruptor is a strand that is pulled up from a catalyst felt.

A micromixer includes static mixers and microturbines. Micromixers can be, for example, flow disruptors as described above. In one preferred embodiment, the micromixer is a corkscrew or spiral winding with the central axis in the direction of flow. Microtubines can be powered by an external electrical source, but more preferably, the turbine is not electrically powered, but is motivated by fluid flow through the turbine. The micromixers are either made of a nonporous catalyst for the intended reaction or a porous or nonporous support material that is coated with a catalytically active material. Preferably, a catalytically active material is dispersed in isolated islands over the surface of the micromixer. More preferably the micromixer is formed of a support material that has a relatively (relative to the support) high surface area coating (preferably a metal oxide) and a catalytically active metal dispersed on the high surface area coating. In some embodiments, a buffer layer can be disposed between the support (the support may be stainless steel, other metal, or ceramic) and the high surface area coating. For low temperature applications, the support can be plastic. A microturbine in a microchannel will either impart energy to the fluid stream or extract energy from the fluid stream. In the former case the microturbine needs to be powered by electrical, mechanical, magnetic, or other power source. In the latter case, the microturbine can be used to generate power for use in another part of the process, or simply to modify the flow characteristics of the fluid stream. In the present invention, a micromixer is a component that is disposed within a bulk flow region of a reaction chamber (preferably a microchannel)— where the bulk flow region is substantially unobstructed except for the micromixer. A micromixer has at least one dimension of 5 mm or less.

According to the present invention, flow disruptors, micromixers (including microturbines) do not form an impermeable barrier in the open flow path such as would force substantially all fluid to flow through the catalyst.

Flow disruptors are preferably drawn materials such as wires or strands that can be welded or adhesively bonded in a microchannel. Micromixers are preferably manufactured separately and placed in a reaction channel; alternatively, the micromixers can be co-cast or machined into a reaction channel. Microturbines can be made using techniques developed in micro-electro-mechanical system technology. Catalytic coatings can be applied by wash-coating, chemical vapor deposition, electrochemical deposition, etc.

Chemical Reactions

Operating conditions can be adapted in particular to the particular conformation of the channel, nature and amount of catalyst, and type of chemical reaction performed. Processes of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (including hydrodesulferizationHDS/HDN), isomerization, methylation, demethylation, metathesis, nitration, oxidation, partial oxidation, polymerization, reduction, reformation, reverse water gas shift, Sabatier, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing catalysts and/or apparatus of the present invention can be identified through knowledge of the prior art and/or routine experimentation. To cite one example, the invention provides a Fischer-Tropsch reaction using any of the catalysts or apparatus described herein wherein the catalytically active metal comprises Co, Fe, Ru, Ni, or a combination of these, and optionally containing a promoter or promoters as known in the art.

In some embodiments, a process will be conducted at temperatures of 300° C. or above, or 450° C. or above, or in some embodiments in the range of 200° C. to 1000° C., or in some embodiments in the range of 300° C. to 800° C. In its broader aspects, the invention is not limited to these temperatures. In some preferred embodiments, the reactants are gaseous and the process is run at greater than 2 atmospheres (atm) absolute, and in some embodiments 20 atm or greater, in some embodiments 100 atm or greater; however, in some embodiments of the invention, reactions can be run at low pressures well below 1 atm.

In some embodiments of the invention, a dispersion of catalyst particles in a fluid is passed through a reaction microchannel. The catalyst particles then pass into a second reactor or are recirculated into the reaction microchannel. In a microchannel reactor the slurry particles need to be small enough to flow smoothly without forming impediments to fluid flow. In a slurry process at least 80% (by mass), more preferably at least 90%, and still more preferably essentially all of the catalyst particles are less than 75 micrometers, preferably less than 50 micrometers, and most preferably less than 20 micrometers in their largest dimension. The exact dimension of the particles is a function of the viscosity of the slurry fluid, the flow rate, gas composition and other factors. Slurry reactors are particularly advantageous for the Fischer-Tropsch reaction where enhanced heat and mass transport are desired.

While the invention has generally been referred to under steady state conditions, it will be appreciated that the heat exchanger(s) can be used to bring (or maintain) a reaction to a desired temperature range. In some embodiments, the adjacent channels could alternatively be used for another reaction—for example, an exothermic reaction can be conducted in a reaction channel and an endothermic reaction conducted in an adjacent reaction channel, in which case the heat exchange channel(s) could also be conducting a chemical reaction, and could contain an appropriate catalyst. The invention includes methods of starting up a reaction using the inventive catalysts and/or apparatus, for example, operating a combustion reaction in a microchannel containing a graded catalyst to provide start-up heat to an adjacent reaction chamber.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A method of conducting a reaction, comprising:
flowing at least one reactant into a microchannel;
wherein the microchannel comprises a graded catalyst;
reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
wherein the graded catalyst has a varying thermal conductivity such that the thermal conductivity in one part of the graded catalyst is at least 50% higher than in another part of the graded catalyst;
and forming at least one product.

2. The method of claim 1 further comprising a step of exchanging heat between the microchannel and an adjacent heat exchanger.

3. A method of conducting a reaction, comprising:
flowing at least one reactant into a microchannel through a microchannel inlet;
wherein the microchannel comprises a center;
wherein the microchannel comprises a graded catalyst that has a varying thermal conductivity such that the thermal conductivity in one part of the graded catalyst is at least 25% higher than in another part of the graded catalyst;
reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arvlation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
and forming at least one product.

4. The method of claim 3 wherein the microchannel has at least two inlets.

5. The method of claim 3 wherein heat is transferred between the microchannel and an adjacent heat exchanger.

6. A method of conducting a reaction, comprising:
flowing at least one reactant into a microchannel through a microchannel inlet;
wherein the microchannel comprises a center and a microchannel wall;
wherein the microchannel contains one catalyst that is a graded catalyst that has a higher concentration of catalytically active material in the catalyst nearer the microchannel wall than the concentration of the catalytically active material in the catalyst nearer the center of the microchannel; and
wherein the microchannel wall is adjacent to a heat exchanger;
reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
simultaneous with the step of reacting, transferring heat between the microchannel and the heat exchanger;
and forming at least one product.

7. The method of claim 6 wherein the heat exchanger is a microchannel heat exchanger.

8. A method of conducting a reaction, comprising:
flowing at least one reactant into a first reaction microchannel;
wherein a catalyst is disposed in the first reaction microchannel;
reacting the at least one reactant in the presence of the graded catalyst within the first reaction microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;

wherein the catalyst is a graded catalyst that has a higher concentration of catalytically active material in the catalyst nearer the microchannel wall than the concentration of the catalytically active material in the catalyst nearer the center of the microchannel;

exchanging heat between the first reaction microchannel and an adjacent, second reaction microchannel;

wherein one of the first or second reaction channels comprises an exothermic reaction and the other of the reaction channels comprises an endothermic reaction;

and forming at least one first product in the first reaction microchannel and forming at least one second product in the second reaction microchannel.

9. The method of claim 8 wherein heat is exchanged while the step of reacting is occurring in the microchannel.

10. The method of claim 8 wherein the second reaction microchannel provides heat for startup.

11. The method of claim 8 wherein the second reaction microchannel comprises a graded catalyst.

12. The method of claim 8 wherein the step of reacting comprises a reaction selected from the group consisting of Fischer-Tropsch, methanol synthesis, and partial oxidation.

13. A method of conducting a reaction, comprising:
flowing at least one reactant into a microchannel;
wherein a catalyst is disposed in the microchannel;
wherein the catalyst consists of a graded catalyst that has a higher concentration of catalytically active material in the catalyst nearer the microchannel wall than the concentration of the catalytically active material in the catalyst nearer the center of the microchannel;
a step of reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
and forming at least one product.

14. The method of claim 13 wherein the step of reacting comprises a reforming reaction and the graded catalyst comprises comprises at least one metal selected from the group consisting of Pt, Ni and Rh.

15. The method of claim 13 wherein the step of reacting comprises a dehydrogenation reaction and the graded catalyst comprises Pd and Zn.

16. A method of conducting a reaction, comprising:
flowing at least one reactant into a microchannel;
wherein a catalyst is disposed in the microchannel;
wherein the graded catalyst has a varying thermal conductivity such that the thermal conductivity in one part of the graded catalyst is at least 25% higher than in another part of the graded catalyst;
a step of reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, hydrocarbon reforming, reverse water gas shift, Sabatier, sulfonation, telomerization, transesterification, trimerization, and water gas shift;
and forming at least one product.

17. The method of claim 16 wherein the step of reacting comprises a Fischer-Tropsch reaction and the graded catalyst comprises at least one metal selected from the group consisting of Co, Ru, Fe, Rh, and Ni.

18. The method of claim 16 wherein the step of reacting comprises a hydrogenation reaction and the graded catalyst comprises at least one metal selected from the group consisting of Co, Pd, Pt, and Ni.

19. The method of claim 16 wherein the step of reacting comprises a hydrogenolysis of an alcohol or ether and the graded catalyst comprises at least one metal selected from the group consisting of Pd, Pt, and Ni.

20. The method of claim 16 wherein the step of reacting comprises a dehydration of an alcohol and the graded catalyst comprises at least one metal selected from the group consisting of Cu, Pt, and Ni.

21. The method of claim 16 wherein the step of reacting comprises a water-gas shift reaction and the graded catalyst comprises at least one metal selected from the group consisting of Fe, CuZn, CoMo, and Ru.

22. The method of claim 16 wherein the step of reacting comprises ammonia synthesis and the graded catalyst comprises Fe.

23. The method of claim 16 wherein the step of reacting comprises a hydrocracking reaction and the graded catalyst comprises at least one metal selected from the group consisting of Pd and Ni-Mo.

24. The method of claim 16 wherein the step of reacting comprises a hydrodesulfurization reaction and the graded catalyst comprises at least one metal selected from the group consisting of Co-Mo and Ni-Mo.

25. The method of claim 6 wherein the catalyst further comprises a variation in a physical property as a function of distance through the catalyst.

26. The method of claim 6 wherein the graded catalyst has a varying thermal conductivity such that the thermal conductivity in one part of the graded catalyst is at least 25% higher than in another part of the graded catalyst.

27. The method of claim 3 wherein the graded catalyst has a varying thermal conductivity such that the thermal conductivity in one part of the graded catalyst is at least 200% higher than in another part of the graded catalyst.

28. The method of claim 1 wherein surface area varies as a function of distance through the catalyst.

29. The method of claim 25 wherein surface area varies as a function of distance through the catalyst.

30. The method of claim 28 wherein the graded catalyst gradually changes its surface area as a function of distance.

31. The method of claim 6 wherein the graded catalyst comprises at least a portion of at least one wall of a bulk flow path through the microchannel.

32. A method of conducting a reaction, comprising:
flowing at least one reactant into a microchannel;
wherein the microchannel comprises a graded catalyst wherein the graded catalyst comprises at least a portion of at least one wall of a bulk flow path through the microchannel;
reacting the at least one reactant in the presence of the graded catalyst within the microchannel;
wherein the reactant, or reactants, and catalyst are selected such that the step of reacting is selected from the group consisting of: acetylation, addition reactions, ailcylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
wherein the physical form of the catalyst varies over the length of the microchannel and forming at least one product.

33. A method of conducting a reaction, comprising:
flowing at least one reactant into a microchannel;
wherein the microchannel comprises a graded catalyst;
reacting the at least one reactant in the presence of the graded catalyst within the microchannel;
wherein the reactant, or reactants, and catalyst are selected such that the step of reacting is selected from the group consisting of: acetylation, addition reactions, alkylation, dealkylation, hydrodealkylation, reductive alkylation, amination, ammoxidation, ammonia synthesis, aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (HDS/HDN), isomerization, methylation, demethylation, metathesis, nitration, polymerization, reduction, reformation, reverse water gas shift, Sabatier, sulfonation, telomerization, transesterification, trimerization, and water gas shift;
wherein the physical form of the catalyst varies over the width of the microchannel;
and forming at least one product.

34. The method of claim 1 wherein the graded catalyst substantially fills a cross section of the microchannel.

35. The method of claim 6 wherein the graded catalyst comprises catalyst particles have an aspect ratio greater than 3 and wherein a majority of these particles are oriented with the particles' ends having a greater amount of catalyst near a microchannel wall.

* * * * *